(12) United States Patent
Park et al.

(10) Patent No.: US 12,257,667 B2
(45) Date of Patent: Mar. 25, 2025

(54) METHOD OF MANUFACTURING WINDOW AND WINDOW FOR DISPLAY DEVICE

(71) Applicant: SAMSUNG DISPLAY CO., LTD., Yongin-si (KR)

(72) Inventors: Cheolmin Park, Hwaseong-si (KR); Seungho Kim, Asan-si (KR); Hoikwan Lee, Suwon-si (KR); Byunghoon Kang, Hwaseong-si (KR); Seung Kim, Seongnam-si (KR); Changmoo Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/158,376

(22) Filed: Jan. 23, 2023

(65) Prior Publication Data

US 2023/0161345 A1 May 25, 2023

Related U.S. Application Data

(63) Continuation of application No. 17/487,288, filed on Sep. 28, 2021.

(30) Foreign Application Priority Data

Feb. 16, 2021 (KR) .................. 10-2021-0020676

(51) Int. Cl.
*C03C 27/04* (2006.01)
*B24B 1/00* (2006.01)
(Continued)

(52) U.S. Cl.
CPC .................. *B24B 9/10* (2013.01); *B24B 1/00* (2013.01); *B24B 9/20* (2013.01); *B24B 29/02* (2013.01);
(Continued)

(58) Field of Classification Search
CPC .... B24B 9/10; B24B 9/20; B24B 1/00; B24B 29/02; B24B 41/002; B24B 41/005;
(Continued)

(56) References Cited

U.S. PATENT DOCUMENTS 6,325,704 B1 12/2001 Brown et al.
6,363,599 B1 4/2002 Bajorek
(Continued)

FOREIGN PATENT DOCUMENTS

JP 2017193482 10/2017
KR 10-139093 4/2014
(Continued)

OTHER PUBLICATIONS

Material Hardness, 21 pages, Copyright 2001, by Calice and The University of Maryland, Retrieve From the Internet.
(Continued)

*Primary Examiner* — Megha M Gaitonde
(74) *Attorney, Agent, or Firm* — F. CHAU & ASSOCIATES, LLC

(57) ABSTRACT

A method of manufacturing a window may include cutting a window having a uniform thickness of about 20 μm to about 100 μm and polishing a cut surface of the window with a polishing pad having an elastic modulus less than an elastic modulus of the window while applying slurry to the cut surface of the window.

13 Claims, 11 Drawing Sheets

(51) Int. Cl.
  *B24B 9/10* (2006.01)
  *B24B 9/20* (2006.01)
  *B24B 29/02* (2006.01)
  *B24B 41/00* (2006.01)
  *B65G 1/137* (2006.01)
  *B65G 43/00* (2006.01)
  *C03B 33/07* (2006.01)
  *C03C 23/00* (2006.01)
  *G05D 1/00* (2006.01)
  *B62D 51/00* (2006.01)

(52) U.S. Cl.
  CPC .......... *B24B 41/002* (2013.01); *B65G 1/1373* (2013.01); *B65G 43/00* (2013.01); *C03B 33/07* (2013.01); *C03B 33/076* (2013.01); *C03C 23/002* (2013.01); *C03C 27/04* (2013.01); *G05D 1/0088* (2013.01); *B62D 51/001* (2013.01)

(58) Field of Classification Search
  CPC ....... B24B 41/06; B24B 57/02; B65G 1/1373; B65G 43/00; C03C 23/002; C03C 27/04; C03C 27/10; G05D 1/0088; B62D 51/001; G09F 9/301; C03B 33/02; C03B 33/078; C03B 33/076; C03B 33/07
  USPC ........ 428/156, 157, 192, 212, 213, 215, 220
  See application file for complete search history.

(56) References Cited

U.S. PATENT DOCUMENTS

| | | | |
|---|---|---|---|
| 8,721,392 | B2 | 5/2014 | Brown et al. |
| 9,028,296 | B2 | 5/2015 | Venkatachalam et al. |
| 10,829,411 | B2 | 11/2020 | Harada et al. |
| 11,318,717 | B2 | 5/2022 | Forenz et al. |
| 2014/0170387 | A1* | 6/2014 | Kashima ................. C03C 21/00 428/157 |
| 2020/0057470 | A1* | 2/2020 | Buono ................. H04B 1/3888 |
| 2021/0368634 | A1* | 11/2021 | Song ..................... G06F 1/1652 |
| 2022/0001652 | A1* | 1/2022 | Murashige ........ B32B 17/10293 |
| 2022/0098097 | A1 | 3/2022 | Lee et al. |
| 2022/0268297 | A1 | 8/2022 | Park et al. |

FOREIGN PATENT DOCUMENTS

| | | | |
|---|---|---|---|
| KR | 10-1620375 | | 5/2016 |
| KR | 10-1661278 | | 9/2016 |
| KR | 10-2020-0039016 | | 4/2020 |
| KR | 10-2020-0087380 | A | 7/2020 |
| TW | 201307079 | A * | 2/2013 ............... B24B 9/10 |
| WO | WO-2020095415 | A1 * | 5/2020 ............. B32B 17/10 |

OTHER PUBLICATIONS

Final Office Action for U.S. Appl. No. 17/487,288.
US Office Action dated Apr. 12, 2024 for U.S. Appl. No. 17/487,288.

* cited by examiner

METHOD OF MANUFACTURING WINDOW AND WINDOW FOR DISPLAY DEVICE

CROSS-REFERENCE TO RELATED APPLICATION(S)

This application is a Continuation of co-pending U.S. patent application Ser. No. 17/487,288, filed on Sep. 28, 2021, which claims priority under 35 USC § 119 to Korean Patent Application No. 10-2021-0020676 filed on Feb. 16, 2021 in the Korean Intellectual Property Office (KIPO), the entire disclosure of which is herein incorporated by reference.

TECHNICAL FIELD

The present disclosure relates to a method of manufacturing a window. More particularly, the present disclosure relates to a window applied to various display devices and a method of manufacturing the window.

DISCUSSION OF THE RELATED ART

A display device is an electronic device that provides visual information to a user. Recently, display devices have been developed that are bendable, foldable, or rollable. These display panels are, in some cases, able to be bent, folded, or rolled during the manufacturing process and are then locked into a desired shape. On other cases, these display panels may be repeatedly bent, folded, or rolled during use.

The display device may include a window for protecting a display panel that generates an image. In these cases, both the display panel and the window might be flexible.

The window may be cut to correspond to the size of the display device during a manufacturing process. A cut surface of the window may be chemically polished with an etchant in order to remove defects or the like of the cut surface of the window. However, when the cut surface of the window is chemically polished, grains are formed on an edge of the window by a chemical reaction between the etchant and the window, and as an outer surface of the edge of the window is angled, an impact strength of the window may decrease.

SUMMARY

A method of manufacturing a window of a display device, the method includes alternately stacking a plurality of windows and a plurality of adhesive layers into a single stack; cutting the single stack; polishing a cut surface of the single stack using a polishing pad while a slurry is applied to the cut surface of the single stack; curing the single stack, and separating each of the plurality of windows from the single stack after the single stack has been cured. The polishing pad has an elastic modulus that is less than an elastic modulus of the window.

The curing may include exposing the single stack to UV light and emerging the single stack into a bath of hot water.

The polishing of the cut surface of the single stack may include polishing each of the plurality of adhesive layers shorter than each of the plurality of windows such that edges of each of the plurality of windows extend past corresponding edges of each of the plurality of adhesive layers.

A method of manufacturing a window includes cutting a window having a uniform thickness of about 20 μm to about 100 μm and polishing a cut surface of the window with a polishing pad having an elastic modulus that is less than an elastic modulus of the window, while applying a slurry to the cut surface of the window.

The window may include glass and/or plastic.

A hardness of the polishing pad may be less than a hardness of the window.

The polishing pad may include a fabric, wool, and/or a polymer.

The slurry may include cerium(IV) oxide ($CeO_2$).

Polishing the cut surface of the window may include polishing the window to remove a length measured from an edge of the window that is equal to about 10% to about 200% of the thickness of the window.

The method may further include, before cutting the window, or after cutting the window and before polishing the cut surface of the window, forming a first adhesive layer and a second adhesive layer on a first surface of the window and a second surface of the window that is opposite to the first surface of the window, respectively.

An elastic modulus of each of the first adhesive layer and the second adhesive layer may be less than the elastic modulus of the window.

A hardness of each of the first adhesive layer and the second adhesive layer may be less than a hardness of the window.

Each of the first adhesive layer and the second adhesive layer may include a resin, an optically clear adhesive (OCA), a rosin, and/or a wax.

The method may further include, after polishing the cut surface of the window, curing each of the window, the first adhesive layer, and the second adhesive layer and separating the first adhesive layer and the second adhesive layer from the window.

The method may further include, after cutting the window and before polishing the cut surface of the window, disposing the window between a first support and a second support.

An area of each of the first support and the second support may be less than an area of the window.

A window for a display device includes a flat portion having a uniform thickness of about 20 μm to about 100 μm and a chamfer portion disposed on at least a portion of an edge of the flat portion, having a thickness less than the thickness of the flat portion, and having an outer surface of a curved shape protruding from the flat portion.

A roughness of the outer surface of the chamfer portion may be about 0.5 nm to about 10 nm.

A distance from an edge of the chamfer portion to the edge of the flat portion may be in a range of about 10% to about 200% of the thickness of the flat portion.

The chamfer portion may include a first curved portion adjacent to a first surface of the flat portion and a second curved portion adjacent to a second surface of the flat portion opposite to the first surface. A radius of curvature of each of the first curved portion and the second curved portion may be in a range of about 10% to about 50% of the thickness of the flat portion.

The chamfer portion may have a uniform radius of curvature. The radius of curvature may be in a range of about 50% to about 100% of the thickness of the flat portion.

The chamfer portion may have different radiuses of curvature along the outer surface of the chamfer portion. The radius of curvature on an edge of the chamfer portion may be in a range of about 20% to about 200% of the thickness of the flat portion.

The outer surface of the chamfer portion adjacent to a surface of the flat portion may have an angle of about 10 degrees to about 30 degrees with respect to a plane extending from the surface of the flat portion.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Hereinafter, methods of manufacturing windows and windows for display devices in accordance with embodiments of the present disclosure will be explained in detail with reference to the accompanying drawings.

Hereinafter, a method of manufacturing a window according to an embodiment of the present disclosure will be described with reference to FIGS. 1 to 9.

Figure 1:
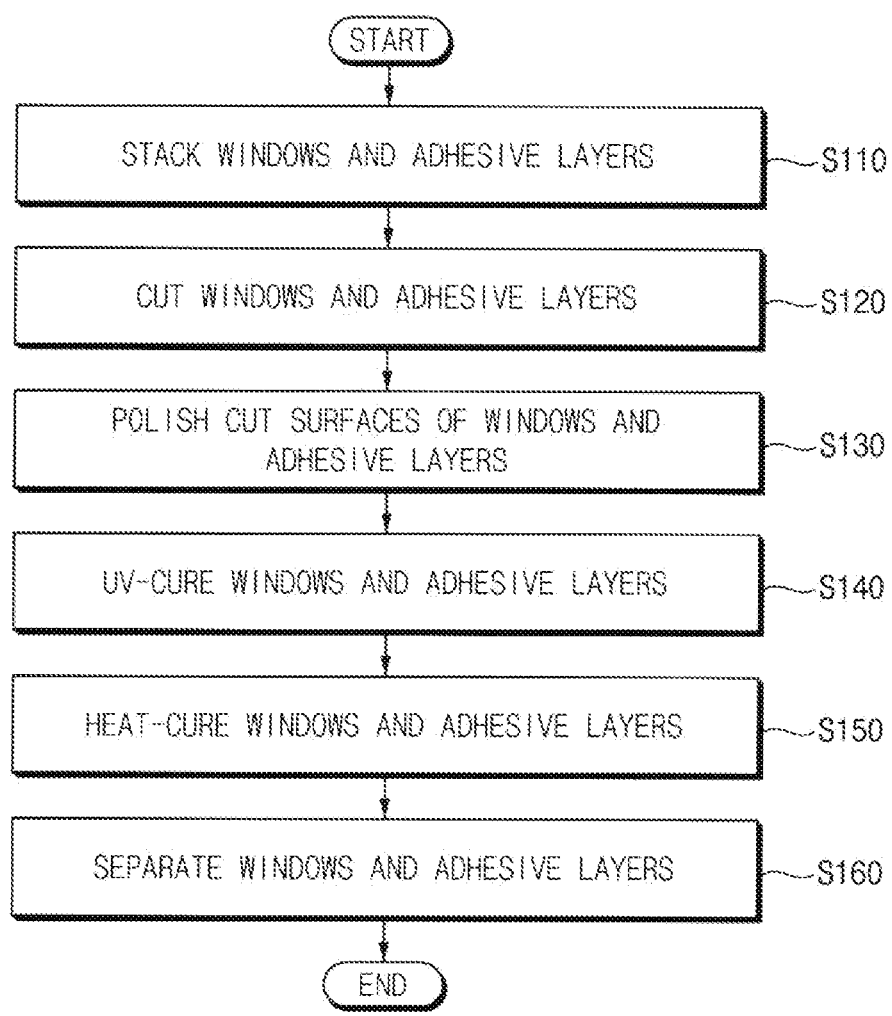
FIG. 1 is a flowchart illustrating a method of manufacturing a window according to an embodiment of the present disclosure.

FIG. 1 is a flowchart illustrating a method of manufacturing a window according to an embodiment of the present disclosure.

Referring to FIG. 1, a method of manufacturing a window according to an embodiment of the present disclosure may include alternately stacking windows and adhesive layers (S110), cutting the stacked windows and the adhesive layers (S120), polishing cut surfaces of the stacked windows and the adhesive layers (S130), UV-curing the stacked windows and the adhesive layers (S140), heat-curing the stacked windows and the adhesive layers (S150), and separating the individual windows and the adhesive layers from the stack (S160).

FIGS. 2, 3, 4, 5, 6, 7, 8, and 9 are diagrams illustrating a method of manufacturing a window according to an embodiment of the present disclosure.

Figure 2:
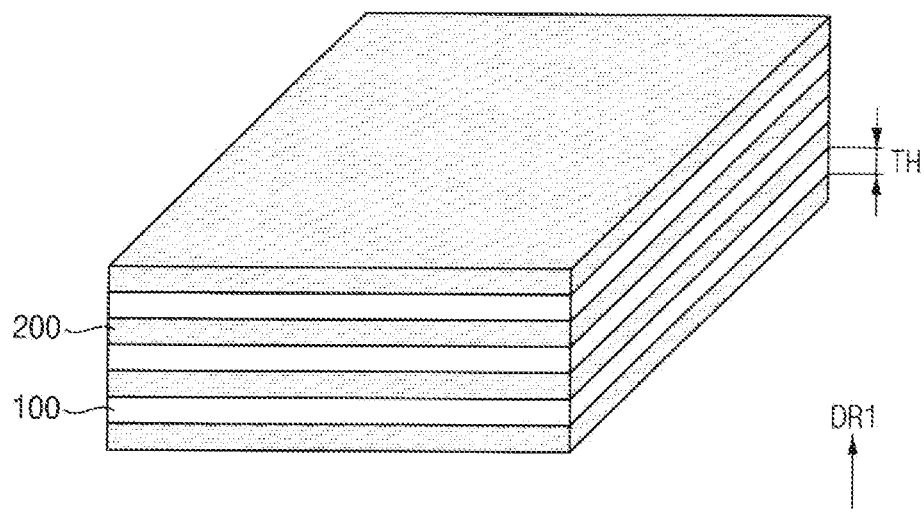
FIGS. 2, 3, 4, 5, 6, 7, 8, and 9 are diagrams illustrating a method of manufacturing a window according to an embodiment of the present disclosure.

Referring to FIGS. 1 and 2, the windows 100 and the adhesive layers 200 may be stacked (S110). The windows 100 and the adhesive layers 200 may be alternately stacked, one-by-one, along a first direction DR1. Each window 100 may be a window for a display device. In an embodiment of the present disclosure, each window 100 may be a window for a flexible display device. Each window 100 may protect components of a display device, and an image generated by the display device may be displayed through the window 100 as the window may be transparent to visible light. As the windows 100 and the adhesive layers 200 are alternately stacked, a plurality of windows 100 may be cut together in a subsequent process, and a cutting time and a cutting cost of the windows 100 may be reduced as compared to a process in which each window 100 is individually cut.

Each window 100 may include a flexible material. For example, each window 100 may include thin glass and/or plastic. The thin glass may be of a thickness that allows for flexibility without cracking or otherwise breaking.

Each window 100 may have a uniform thickness TH. The thickness TH of each window 100 may be defined as a length of the window 100 in the first direction DR1. The thickness TH of each window 100 may be about 20 μm to about 100 μm. When the thickness TH of the window 100 is less than about 20 μm, handling of the window 100 may be difficult, and the window 100 might not sufficiently protect the components of the display device. When the thickness TH of the window 100 is greater than about 100 μm, the flexible characteristic of the window 100 may decrease, and a flexural strength of the window 100 may decrease.

The adhesive layers 200 may serve to fix the stacked windows 100 to one another. Accordingly, the adhesive layers 200 may each include an adhesive material. For example, the adhesive layers 200 may each include a resin, an optically clear adhesive (OCA), a rosin, and/or a wax.

An elastic modulus of each adhesive layer 200 may be less than an elastic modulus of each window 100. Further, a hardness of each adhesive layer 200 may be less than a hardness of each window 100.

Figure 3:
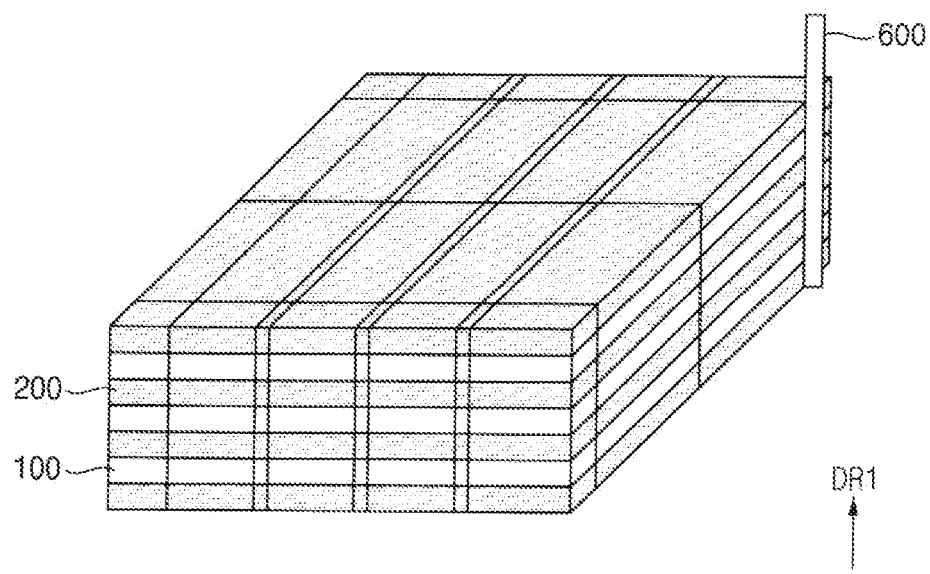

Referring to FIGS. 1 and 3, the stacked windows 100 and adhesive layers 200 may be cut (S120). The stacked windows 100 and adhesive layers 200 may be cut together by a blade or laser beam 600. For example, the stacked windows 100 and adhesive layers 200 may be cut using computer numerical control (CNC). As the stacked windows 100 and adhesive layers 200 are cut together, areas of the cut adhesive layers 200 may be substantially equal to areas of the cut windows 100. This is to say, an area of each adhesive layer 200 is substantially equal to an area of each window 100.

Each of the cut windows 100 may have a size corresponding to a size of one display device. For example, the window 100 may be cut such that each of the cut windows 100 is included in one display device.

Figure 4:
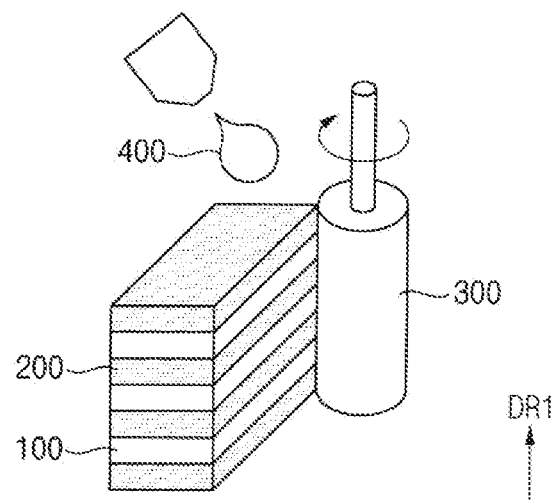

Referring to FIGS. 1 and 4, the cut surfaces of the windows 100 and the adhesive layers 200 may be polished (S130). The cut surfaces of the windows 100 and the adhesive layers 200 may correspond to edges of the cut windows 100 and adhesive layers 200.

The cut surfaces of the windows 100 and the adhesive layers 200 may be polished with a polishing pad 300 while applying slurry 400 to the cut surfaces of the windows 100 and the adhesive layers 200. The polishing pad 300 may rotate clockwise or counterclockwise along a rotation axis extending in the first direction DR1. The slurry 400 may contact the cut surfaces of the windows 100 due to the rotation of the polishing pad 300, and may directly polish the cut surfaces of the windows 100.

The polishing pad 300 may include a fabric, wool, and/or a polymer. The slurry 400 may include cerium(IV) oxide ($CeO_2$), which may be called "ceria".

An elastic modulus of the polishing pad 300 may be less than an elastic modulus of each window 100. Further, a hardness of the polishing pad 300 may be less than a hardness of each window 100.

Figure 5:
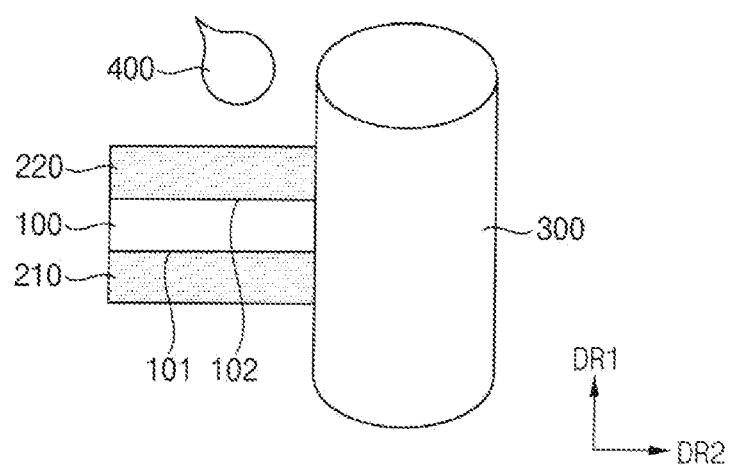
Figure 6:
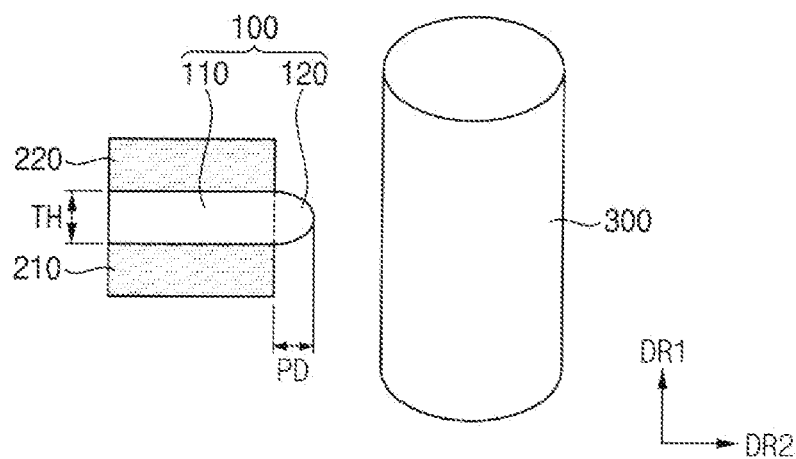

FIG. 5 is a diagram illustrating one window 100 and two adhesive layers 210 and 220, before polishing, and FIG. 6 is a diagram illustrating the window 100 and the adhesive layers 210 and 220 after polishing.

Referring to FIGS. 5 and 6, a first adhesive layer 210 may be formed on a first surface 101 of the cut window 100, and a second adhesive layer 220 may be formed on a second surface 102 of the cut window 100 opposite to the first surface 101. For example, the first surface 101 and the second surface 102 of the window 100 may be a lower surface and an upper surface of the window 100, respectively.

The cut surfaces of the window 100 and the adhesive layers 210 and 220 before polishing may be parallel to each other. For example, the edges of the window 100 and the adhesive layers 210 and 220 before polishing might not protrude or recess in a second direction DR2 crossing the first direction DR1.

Defects formed during the cutting process of the window 100 may remain on the cut surface of the window 100 before polishing. These defects, if left to remain on the cut surface of the window 100, might reduce the bending strength of the window 100.

A corner having a right-angled shape in a cross-sectional view may be formed at each of opposite ends of the cut surface of the window 100 before polishing. For example, the cut window 100 may have a rectangular prism shape in which all corners are right angles. However, the corners of the window 100 that were cut will have right angles even if one or more of the other corners of the window 100 are not at right angles. For example, the corner may be formed at each of a first end of the cut surface of the window 100 before polishing where the cut surface contacts the first surface 101 and a second end of the cut surface of the window 100 before polishing where the cut surface contacts the second surface 102.

Edges of the window 100 and the adhesive layers 210 and 220 after polishing might not be parallel to each other. The edge of the window 100 after polishing may protrude in the second direction DR2 farther than the edges of the adhesive layers 210 and 220 after polishing.

As the cut surface of the window 100 is polished, the defects that remain on the cut surface of the window 100 may be removed. Accordingly, the flexural strength of the window 100 may increase by polishing, and the flexural strength of the window 100 after polishing may be relatively large.

Since the elastic modulus and the hardness of the adhesive layers 210 and 220 are less than the elastic modulus and the hardness of the window 100, respectively, the amount of polishing of the adhesive layers 210 and 220 by the polishing pad 300 and the slurry 400 may be greater than the amount of polishing of the window 100 by the polishing pad 300 and the slurry 400. Accordingly, in addition to the cut surface of the window 100, the first surface 101 of the window 100 in contact with the first adhesive layer 210 and the second surface 102 of the window 100 in contact with the second adhesive layer 220 may be polished. Accordingly, the window 100 after polishing may include a flat portion 100 that is not polished and a chamfer portion 120 that is polished. The flat portion 110 may overlap the polished adhesive layers 210 and 220, and may have a uniform thickness TH. The chamfer portion 120 may be disposed on an edge of the flat portion 110, and may protrude in the second direction DR2 farther than the polished adhesive layers 210 and 220. The chamfer portion 120 may correspond to a bezel of the display device including the window 100.

The window 100 may be polished so as to reduce the length thereof in the DR2 direction by about 10% to about 200% of the thickness TH of the window 100 in the DR1 direction. A distance in the second direction DR2 from the edge of the chamfer portion 120 to the edge of the flat portion 110 may be defined as a polishing distance PD, and the polishing distance PD may be about 10% to about 200% of the thickness TH of the window 100. When the polishing distance PD is less than about 10% of the thickness TH of the window 100, the polishing pad 300 might not sufficiently polish the cut surface of the window 100. When the polishing distance PD is greater than about 200% of the thickness TH of the window 100, a width of the chamfer portion 120 in the second direction DR2 may increase to a predetermined width or more, accordingly, the bezel of the display device including the window 100 may increase by more than a predetermined width.

The polishing distance PD may be controlled based on a polishing pressure and a polishing time. The type of slurry used may also affect polishing distance PD. The polishing distance PD may be proportional to the polishing pressure and the polishing time. For example, the polishing distance PD may decrease as the polishing pressure and the polishing time decrease, and the polishing distance PD may increase as the polishing pressure and the polishing time increase.

Figure 7:
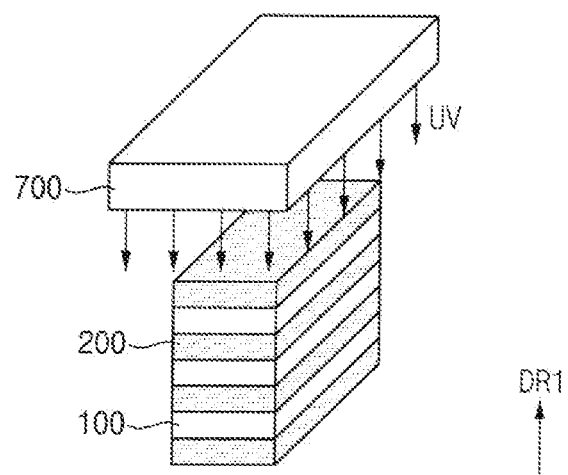

Referring to FIGS. 1 and 7, the windows 100 and the adhesive layers 200 which are polished may be UV-cured (S140). A UV curing machine 700 disposed in the first direction DR1 from the windows 100 and the adhesive layers 200 which are polished may irradiate the windows 100 and the adhesive layers 200 with ultraviolet (UV) light, so that the windows 100 and the adhesive layers 200 may be UV-cured. The UV curing machine 700 may be or may include, for example, on or more UV lamp, bulb, light-emitting diode (LED), etc.

Figure 8:
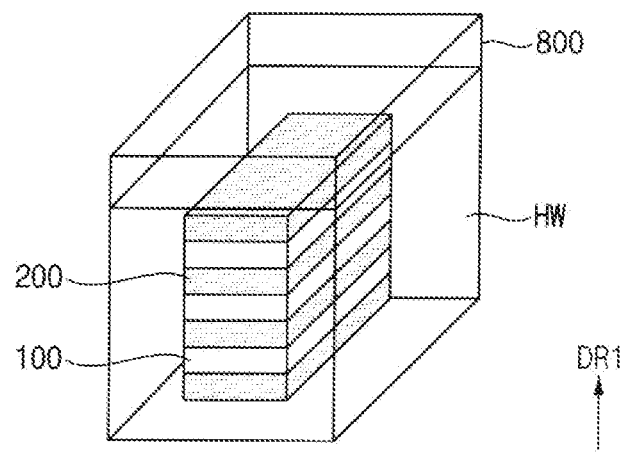

Referring to FIGS. 1 and 8, the windows 100 and the adhesive layers 200 which are UV-cured may be heat-cured (S150). The windows 100 and the adhesive layers 200 which are UV-cured may be immersed in a water tank 800 containing hot water HW to heat-cure the windows 100 and the adhesive layers 200. The hot water HW may be of a temperature within a range from 22° C. to 100° C.

Figure 9:
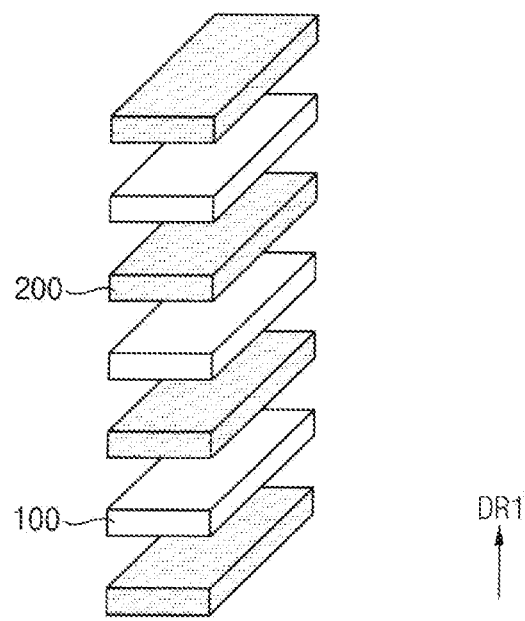

Referring to FIGS. 1 and 9, the windows 100 and the adhesive layers 200 which are heat-cured may be separated (S160). The adhesive strengths of the adhesive layers 200 may be reduced through UV-curing and heat-curing, and accordingly, the windows 100 and the adhesive layers 200 may be easily separated from one another.

Hereinafter, a method of manufacturing a window according to an embodiment of the present disclosure will be described with reference to FIGS. 10 to 12.

Figure 10:
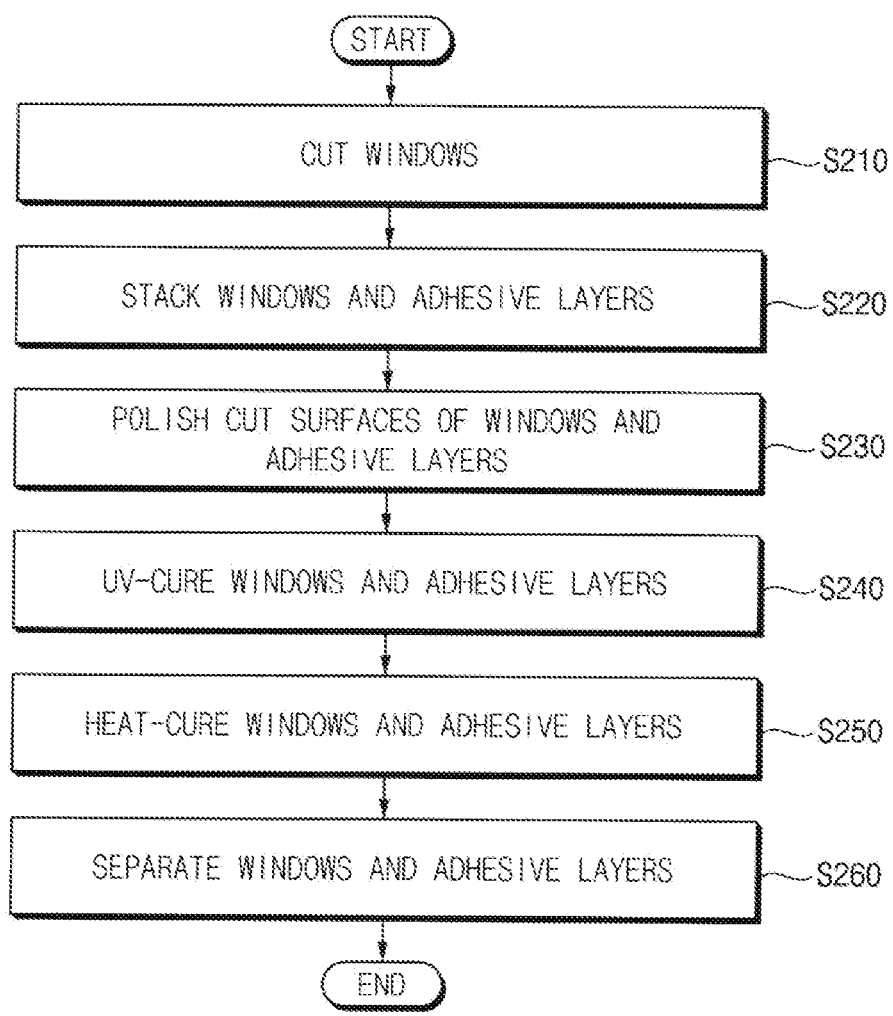
FIG. 10 is a flowchart illustrating a method of manufacturing a window according to an embodiment of the present disclosure.

FIG. 10 is a flowchart illustrating a method of manufacturing a window according to an embodiment of the present disclosure.

Referring to FIG. 10, a method of manufacturing a window according to an embodiment of the present disclosure may include cutting windows (S210), stacking the windows and adhesive layers (S220), polishing cut surfaces of the windows and the adhesive layers (S230), UV-curing the windows and the adhesive layers (S240), heat-curing the windows and the adhesive layers (S250), and separating the windows and the adhesive layers (S260). In a method for manufacturing the window according to an embodiment of the present disclosure, polishing the cut surfaces of the windows and the adhesive layers (S230), UV-curing the windows and the adhesive layers (S240), heat-curing the windows and the adhesive layers (S250), and separating the windows and the adhesive layers (S260) are substantially the same as or similar to polishing the cut surfaces of the windows and the adhesive layers (S130), UV-curing the windows and the adhesive layers (S140), heat-curing the windows and the adhesive layers (S150), and separating the windows and the adhesive layers (S160) of the method for manufacturing the window discussed above, respectively. Accordingly, to the extent that descriptions of steps S230, S240, S250, and S260 are not provided herein, it may be assumed that these steps are at least similar to steps S130, S140, S150, and S160, respectively.

Figure 11:
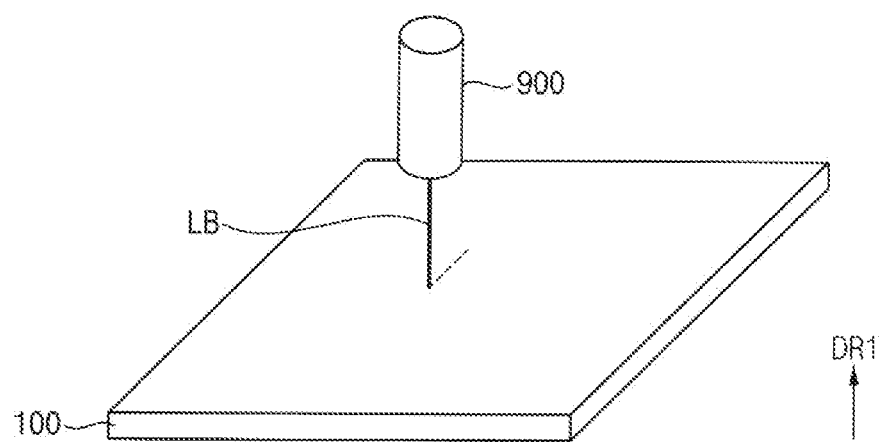
FIGS. 11 and 12 are diagrams illustrating a method of manufacturing a window according to an embodiment of the present disclosure.
Figure 12:
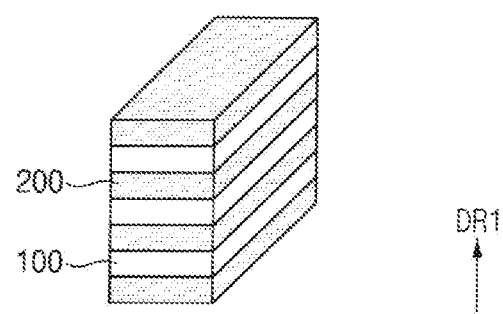

FIGS. 11 and 12 are diagrams illustrating a method of manufacturing the window according to an embodiment of the present disclosure.

Referring to FIGS. 10 and 11, the windows 100 may be cut (S210). Each of the windows 100 may be individually cut as opposed to being cut in a stack, as explained above. The window 100 may be cut by irradiating the window 100 with a laser beam LB from a laser cutter 900 disposed in the first direction DR1 from the window 100. Each of the cut windows 100 may have a size corresponding to the size of one display device.

Referring to FIGS. 10 and 12, the cut windows 100 and the adhesive layers 200 may be stacked (S220). The windows 100 and the adhesive layers 200 may be alternately stacked along the first direction DR1. Areas of the adhesive layers 200 may be substantially equal to areas of the cut windows 100. Thus, here, the windows 100 and adhesive layers 200 are stacked after cutting as opposed to prior to cutting, which was discussed above.

Figure 13:
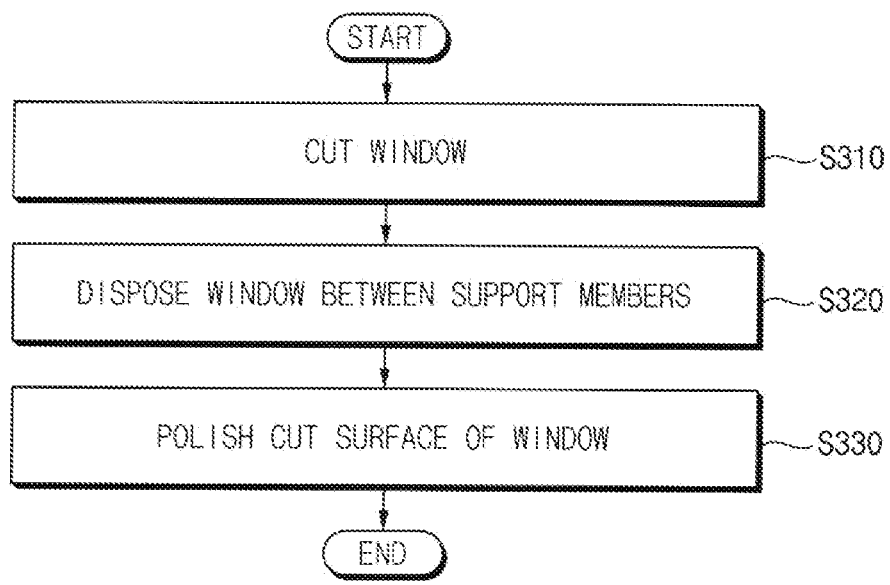
FIG. 13 is a flowchart illustrating a method of manufacturing a window according to an embodiment of the present disclosure.

FIG. 13 is a flowchart illustrating a method of manufacturing a window according to an embodiment of the present disclosure.

Referring to FIG. 13, the method of manufacturing the window according to an embodiment of the present disclosure may include cutting a window (S310), disposing the window between support members (S320), and polishing a cut surface of the window (S330). In the method for manufacturing the window according to an embodiment of the present disclosure, cutting the window (S310) and polishing the cut surface of the window (S330) are substantially the same as or similar to cutting the windows (S210) and polishing the cut surfaces of the windows and the adhesive layers (S230) of the method for manufacturing the window described above, respectively. Accordingly, to the extent that descriptions on the steps S310 and S330 are not provided, it may be assumed that these steps are at least similar to the steps of cutting S210 and polishing S230 discussed above, respectively.

Figure 14:
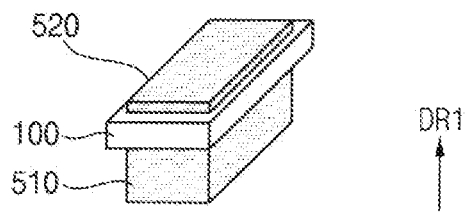
FIG. 14 is a diagram illustrating a method of manufacturing a window according to an embodiment of the present disclosure.

FIG. 14 is a diagram illustrating a method of manufacturing a window according to an embodiment of the present disclosure.

Referring to FIGS. 13 and 14, the cut window 100 may be disposed between the supporting members 510 and 520 (S310). A first support member 510 may be disposed on a first surface of the cut window 100, and a second support member 520 may be disposed on a second surface of the cut window 100 opposite to the first surface. The support members 510 and 520 may support the window 100 in the process of polishing the cut window 100. The support members 510 and 520 may each be a support block (referred to herein simply as "a support") and these supports 510 and 520 may contain the window 100 and keep it in place by the force of the supports 510 and 520 pushing toward each other like a vice and/or by friction.

An area of each of the first support member 510 and the second support member 520 may be less than an area of the window 100 causing the window 100 to overhang the first support member 510 and the second support member 520. Accordingly, in the process of polishing the cut surface of the window 100, the first surface of the window 100 which contacts the first support member 510 and the second surface of the window 100 which contacts the second support member 520 as well as the cut surface of the window 100 may be polished. Accordingly, an edge of the polished window 100 may have a curved outer surface.

In a method of manufacturing a window according to an embodiment of the present disclosure, the process of stacking the window 100 and an adhesive layer, curing the window 100 and the adhesive layer, and separating the window 100 and the adhesive layer may be omitted because the cut surface of one window 100 is polished without the use of an adhesive layer.

In the prior art, a window may be polished in a chemical manner using an etchant. In this case, grains may be formed on a cut surface of the window by a chemical reaction between the etchant and the cut surface of the window, and accordingly, the roughness of the cut surface of the window may increase. When the roughness of the cut surface of the window increases, the impact strength of the cut surface of the window may decrease. In addition, when the window is polished in the chemical manner, an outer surface of an edge of the window may be angled, and accordingly, the impact strength of the cut surface of the window may decrease.

Further, in the prior art, chemical substances (e.g., hydrofluoric acid, sulfuric acid, nitric acid, phosphoric acid, etc.) included in the etchant used in chemical polishing may cause environmental pollution. Moreover, an etchant rinse process may be additionally required to remove the chemical substances.

In the embodiments of the present invention, the window 100 may be polished in a mechanical manner using the polishing pad 300 and the slurry 400. In this case, grains might not be formed on the cut surface of the window 100, and accordingly, the roughness of the cut surface of the window 100 may decrease. Accordingly, the impact strength of the cut surface of the window 100 may increase. Further, when the window 100 is polished in the mechanical manner, the outer surface of the edge of the window 100 may be formed to be rounded, and accordingly, the impact strength of the cut surface of the window 100 may increase.

Further, in the embodiments of the present invention, the slurry 400 used in mechanical polishing might not cause environmental pollution because the slurry 400 may simply be an abrasive compound that does not contain a chemical substance. Moreover, since no chemical substances are used in the polishing process of the window 100, the etchant rinse process of the prior art may be omitted.

Hereinafter, a window for a display device according to embodiments of the present disclosure will be described with reference to FIGS. 15 to 19.

Figure 15:
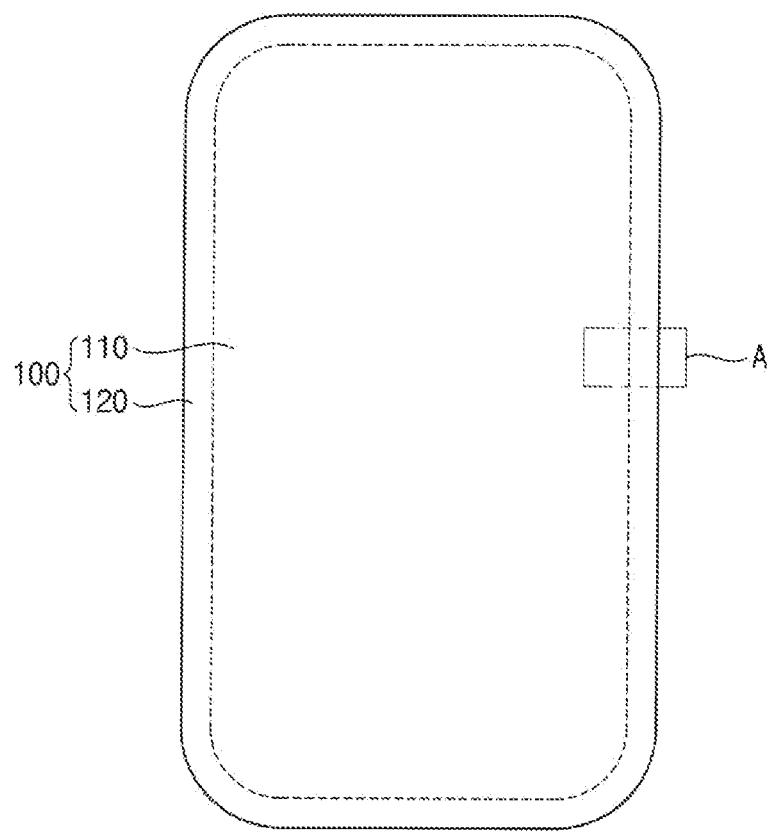
FIG. 15 is a plan view illustrating a window for a display device according to embodiments of the present disclosure.
Figure 16:
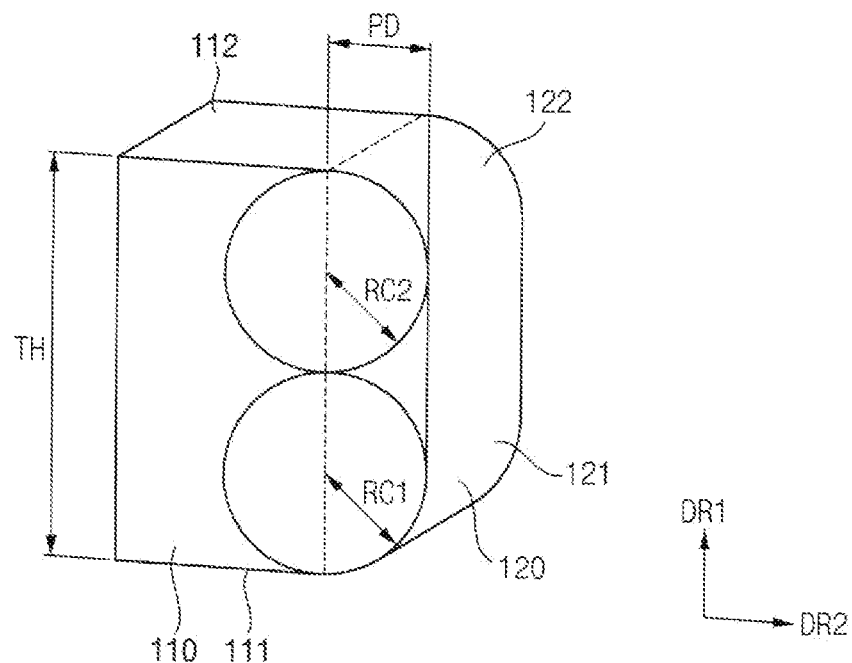
FIG. 16 is a perspective view illustrating a window for a display device according to an embodiment of the present disclosure.

FIG. 15 is a plan view illustrating a window 100 for a display device according to embodiments of the present disclosure. FIG. 16 is a perspective view illustrating a window 100 for a display device according to an embodiment of the present disclosure. FIG. 16 may illustrate an example of an area A in FIG. 15.

Referring to FIGS. 15 and 16, a window 100 may include a flat portion 110 and a chamfer portion 120. The flat portion 110 may have a rectangular shape with rounded corners in a plan view. However, the planar shape of the flat portion 110 is not necessarily limited thereto, and the flat portion 110 may have various planar shapes such as a polygonal planar shape, a circular planar shape, an elliptical planar shape, or the like.

The flat portion 110 may have a uniform thickness TH. The thickness TH of the flat portion 110 may be about 20 μm to about 100 μm. When the thickness TH of the flat portion 110 is less than about 20 μm, handling of the window 100 may be difficult, and the window 100 might not sufficiently protect the components of the display device. When the thickness TH of the flat portion 110 is greater than about 100 μm, the flexible characteristic of the window 100 may decrease.

The chamfer portion 120 may be disposed on at least a portion of an edge of the flat portion 110. For example, the chamfer portion 120 may surround at least a portion of the flat portion 110. In an embodiment of the present disclosure, as illustrated in FIG. 15, the chamfer portion 120 may be disposed on an entire edge of the flat portion 110 to fully surround the flat portion 110.

The bezel of the display device may overlap at least the chamfer portion 120. In an embodiment, the bezel of the display device may overlap an entirety of the chamfer portion 120 and a part of the flat portion 110 adjacent to the chamfer portion 120, and a black matrix or other light-blocking pattern may be formed on the bezel.

The chamfer portion 120 may have a thickness less than the thickness TH of the flat portion 110. The thickness of the chamfer portion 120 may decrease along the second direction DR2 from the edge of the flat portion 110 toward the edge of the chamfer portion 120.

The chamfer portion 120 may have a curved outer surface protruding from the flat portion 110. The outer surface of the chamfer portion 120 may have a relatively small roughness. In an embodiment, the roughness of the outer surface of the chamfer portion 120 may be about 0.5 nm to about 10 nm. As described above, the window 100 may be polished in a mechanical manner using the polishing pad 300 and the slurry 400, and accordingly, the outer surface of the chamfer portion 120 may have a relatively small roughness (i.e., it may be relatively smooth). Accordingly, the window 100 may have a relatively high impact strength.

A distance from the edge of the chamfer portion 120 to the edge of the flat portion 110 may be about 10% to about 200% of the thickness TH of the flat portion 110. The distance from the edge of the chamfer portion 120 to the edge of the flat portion 110 in the second direction DR2 may be defined as a polishing distance PD. When the polishing distance PD is less than about 10% of the thickness TH of the flat portion 110, defects generated during the cutting process of the window 100 may remain on the outer surface of the chamfer portion 120. When the polishing distance PD is greater than about 200% of the thickness TH of the flat portion 110, the width of the chamfer portion 120 in the second direction DR2 may increase to a predetermined width or more, and accordingly, the bezel of the display device including the window 100 may increase by more than a predetermined width.

The chamfer portion 120 may include a first curved portion 121 adjacent to a first surface 111 of the flat portion 110 and a second curved portion 122 adjacent to a second surface 112 of the flat portion 110 opposite to the first surface 111. Each of a radius of curvature RC1 of the first curved portion 121 and a radius of curvature RC2 of the second curved portion 122 may be about 10% to about 50% of the thickness TH of the flat portion 110.

Figure 17:
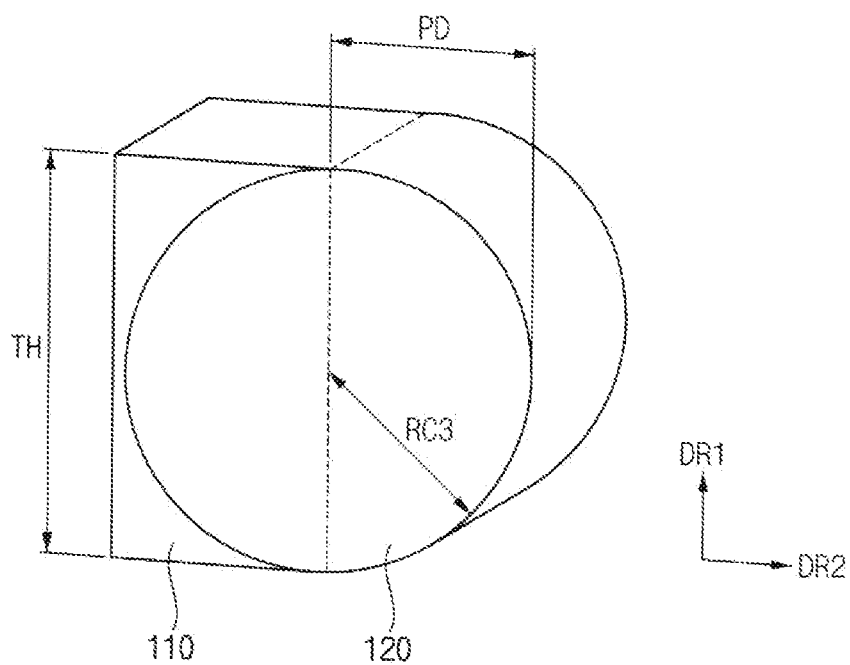
FIG. 17 is a perspective view illustrating a window for a display device according to an embodiment of the present disclosure.

FIG. 17 is a perspective view illustrating a window 100 for a display device according to an embodiment of the present disclosure. FIG. 17 may illustrate an example of the area A in FIG. 15.

Referring to FIG. 17, the chamfer portion 120 may have a uniform radius of curvature RC3. The radius of curvature RC3 of the chamfer portion 120 may be about 50% to about 100% of the thickness TH of the flat portion 110.

The polishing pressure and the polishing time in the process of manufacturing the window 100 discussed here may be greater than the polishing pressure and the polishing time in the process of manufacturing the window 100 discussed above. For example, the polishing distance PD of the window 100 discussed here may be greater than the polishing distance PD of the window 100 discussed above. For example, the polishing distance PD of the window 100 discussed above may be about 20% to about 30% of the thickness TH of the flat portion 110, and the polishing distance PD of the window 100 discussed here may be about 50% of the thickness TH of the flat portion 110.

Figure 18:
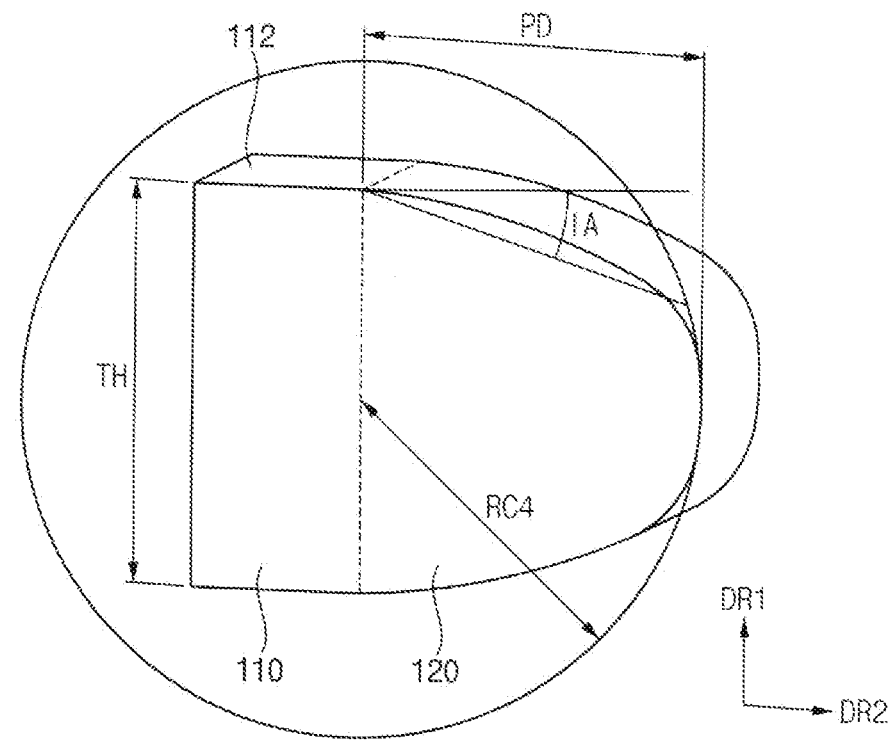
FIG. 18 is a perspective view illustrating a window for a display device according to an embodiment of the present disclosure.
Figure 19:
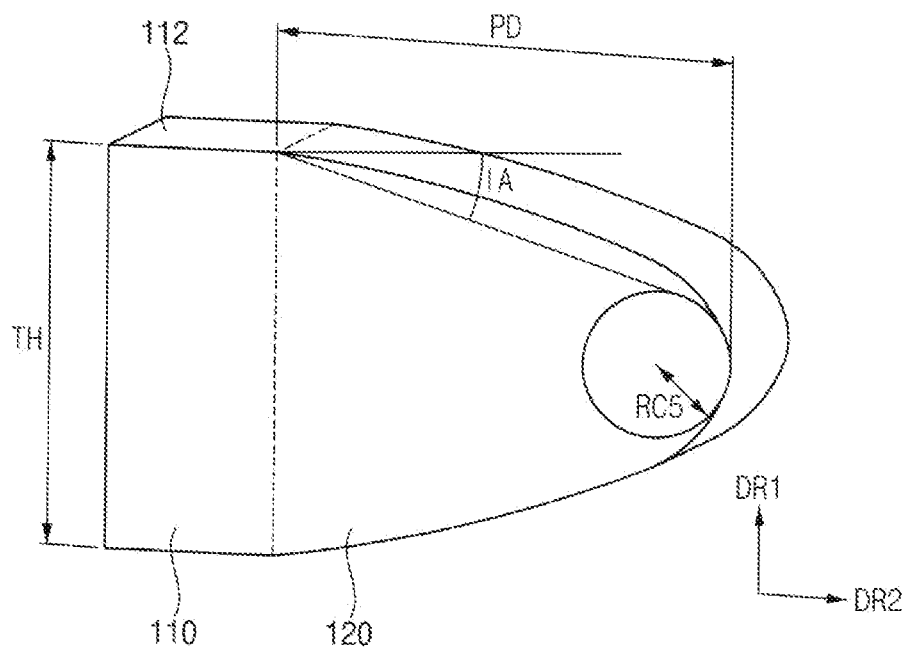
FIG. 19 is a perspective view illustrating a window for a display device according to an embodiment of the present disclosure.

FIG. 18 is a perspective view illustrating a window 100 for a display device according to an embodiment of the present disclosure. FIG. 18 may illustrate an example of the area A in FIG. 15. FIG. 19 is a perspective view illustrating a window 100 for a display device according to an embodiment of the present disclosure. FIG. 19 may illustrate an example of the area A in FIG. 15.

Referring to FIGS. 18 and 19, the chamfer portion 120 may have different radiuses of curvature from each other along the outer surface of the chamfer portion 120. The radiuses of curvature RC4 and RC5 of the chamfer portion 120 at the edge of the chamfer portion 120 may be about 20% to about 200% of the thickness TH of the flat portion 110.

The outer surface of the chamfer portion 120 adjacent to a surface of the flat portion 110 may have an included angle IA of about 10 degrees to about 30 degrees with respect to an imaginary surface extending from the surface of the flat portion 110. For example, the included angle IA between the outer surface of the chamfer portion 120 adjacent to the second surface 112 of the flat portion 110 and an imaginary surface extending from the second surface 112 of the flat portion 110 may be about 10 degrees to about 30 degrees.

The polishing pressure and the polishing time in the process of manufacturing the window 100 according to an embodiment of the present disclosure may be greater than the polishing pressure and the polishing time in the process of manufacturing the window 100 according to the approach described above, respectively. For example, the polishing distance PD of the window 100 discussed here may be greater than the polishing distance PD of the window 100 discussed above. For example, the polishing distance PD of the window 100 discussed here may be about 100% of the thickness TH of the flat portion 110.

The polishing pressure and polishing time in the process of manufacturing the window 100 according to an embodiment of the present disclosure may be greater than the polishing pressure and the polishing time in the process of manufacturing the window 100 discussed above, respectively. For example, the polishing distance PD of the window 100 discussed here may be greater than the polishing distance PD of the window 100 discussed above. For example, the polishing distance PD of the window 100 discussed here may be about 150% of the thickness TH of the flat portion 110.

In the prior art, the window may be polished in a chemical manner. In this case, the roughness of the cut surface of the window may increase, and the outer surface of the edge of the window may be angled. Accordingly, the impact strength of the cut surface of the window may be reduced.

In an embodiments of the present invention, the window 100 may be polished in a mechanical manner. In this case, the roughness of the cut surface of the window 100 may be reduced, and the outer surface of the edge of the window 100 may be rounded. Accordingly, the impact strength of the cut surface of the window 100 may increase.

The window according to an embodiments of the present disclosure may be applied to a display device included in a computer monitor, a notebook computer, a mobile phone, a smart phone, a smart pad, a tablet computer, a personal media player (PMP), a personal digital assistant (PDA), an MP3 player, or the like.

Although the methods of manufacturing the windows and the windows for the display devices according to the embodiments have been described with reference to the drawings, the illustrated embodiments are examples, and may be modified and changed by a person having ordinary knowledge in the relevant technical field without departing from the technical spirit of the present disclosure.

What is claimed is:

1. A flexible display device, comprising:
a bendable glass window having a thickness within a range of 20 μm to 100 μm in a first direction, the glass window having a flat portion and an edge of the glass window having a curved cross-sectional shape,
wherein an image is displayed through the glass window, and
wherein the curved cross-sectional shape of the glass window has a radius of curvature at a location farthest from the flat portion that is less than a distance from the location farthest from the flat portion to the flat portion and angle with respect to a plane of the flat portion to a point on an imaginary circle of the radius of curvature is 10 degrees to 30 degrees.

2. The flexible display device of claim 1, wherein the curved cross-sectional shape of the glass window is disposed on an entirety of the edge of the flat portion to substantially surround the flat portion.

3. The flexible display device of claim 1, wherein the distance from the location farthest from the flat portion to the flat portion is in a range of about 10% to about 200% of the thickness of the flat portion.

4. The flexible display device of claim 1, wherein a roughness of the outer surface of the chamfer portion is 0.5 nm to 10 nm.

5. The flexible display device of claim 1, wherein the curved cross-sectional shape of the glass window has multiple different radiuses of curvature.

6. The flexible display device of claim 5, wherein each of the multiple radiuses of curvature is in a range of from about 20% to about 200% of the thickness of the flat portion.

7. The flexible display device of claim 1, wherein the flexible display device is bendable, foldable, or rollable.

8. A method of manufacturing a glass window for a display device, the method comprising:
stacking glass windows in a first direction, the glass windows each having a thickness within a range of about 20 μm to about 100 μm in the first direction; and
polishing edges of the glass windows in a mechanical manner,
wherein each of the glass windows has a flat portion and an edge having a curved cross-sectional shape having a radius of curvature at a location farthest from the flat portion that is less than a distance from the location farthest from the flat portion to the flat portion and an angle with respect to a plane of the flat portion to a point on an imaginary circle of the radius of curvature is 10 degrees to 30 degrees.

9. The method of claim 8, wherein the polishing of the edges of the glass windows includes polishing the glass windows from the edges of the glass windows in a second direction crossing the first direction to reduce their lengths within a range of from about 10% to about 200% of the thickness of each of the glass windows.

10. A method of manufacturing a glass window for a display device, the method comprising:
stacking cut glass windows in a first direction, each of the glass windows having a size corresponding to a size of a display device; and
polishing cut surfaces of the glass windows,
wherein each of the glass windows has a flat portion and an edge having a curved cross-sectional shape having a radius of curvature at a location farthest from the flat portion that is less than a distance from the location farthest from the flat portion to the flat portion and an angle with respect to a plane of the flat portion to a point on an imaginary circle of the radius of curvature is 10 degrees to 30 degrees.

11. The method of claim 10, further comprising:
forming a first adhesive layer and a second adhesive layer respectively on a first surface of a glass window that is one of the glass windows and a second surface of the glass window opposite to the first surface,
wherein the polishing of the cut surfaces of the glass windows includes polishing the first surface and the second surface of the glass window together with a cut surface of the glass window.

12. The method of claim 10, further comprising:
cutting the glass windows before the stacking of the glass windows,
wherein the stacking of the glass windows includes stacking adhesive layers alternately with the glass windows in the first direction.

13. The method of claim 12, further comprising:
separating the glass windows and the adhesive layers from each other by immersing the glass windows and the adhesive layers in a hot water after the polishing of the cut surfaces of the glass windows.

* * * * *